Feb. 5, 1929.

H. GRÜSS 1,701,181

PROCESS OF USING AN APPARATUS FOR THE DETERMINATION OF
THE AMOUNT OF CARBONIC ACID CONTAINED IN FLUE GASES

Filed Oct. 11, 1927

INVENTOR
HEINZ GRÜSS
BY
Sitka, Kehlenbeck & Farley
ATTORNEYS

Patented Feb. 5, 1929.

1,701,181

UNITED STATES PATENT OFFICE.

HEINZ GRÜSS, OF BERLIN-STAAKEN, GERMANY, ASSIGNOR TO SIEMENS & HALSKE, AKTIENGESELLSCHAFT, OF SIEMENSSTADT, NEAR BERLIN, GERMANY, A CORPORATION OF GERMANY.

PROCESS OF USING AN APPARATUS FOR THE DETERMINATION OF THE AMOUNT OF CARBONIC ACID CONTAINED IN FLUE GASES.

Application filed October 11, 1927, Serial No. 225,584, and in Germany October 25, 1926.

The present invention relates to a new and useful method of using an apparatus for determining the amount of carbonic acid contained in flue gases.

It is well known that the amount of carbonic acid contained in flue gases may be determined by conducting them past an electrically heated testing wire, the resistance of which is being measured. In this method use is made generally of a Wheatstone bridge connection in which, in addition to the testing wires around which the flue gases pass, comparison wires are provided which are surrounded by a comparison gas such as air for example. The measuring instrument is inserted in the diagonal conductor of the bridge, and indicates or registers the percentage of carbonic acid contained in the flue gases. In this method the testing wires and also the comparison wires are heated to temperatures slightly above 100° C. and a series of sources of errors are eliminated by suitably mounting the testing and the comparison wires and by suitably conducting the current of flue gases. It has been found however, that in this known method errors in measurement may sometimes occur which are caused by variations in the working voltage albeit trivial per se and which cannot always be avoided in actual practice.

The object of the present invention is to overcome the above mentioned drawbacks. This is achieved according to this invention by heating the testing wires to a higher temperature than heretofore and using definitely determined ranges of heating temperatures for the measurement.

In order that my invention may be more clearly understood, an embodiment of the invention is illustrated in the drawing.

Figure 1:
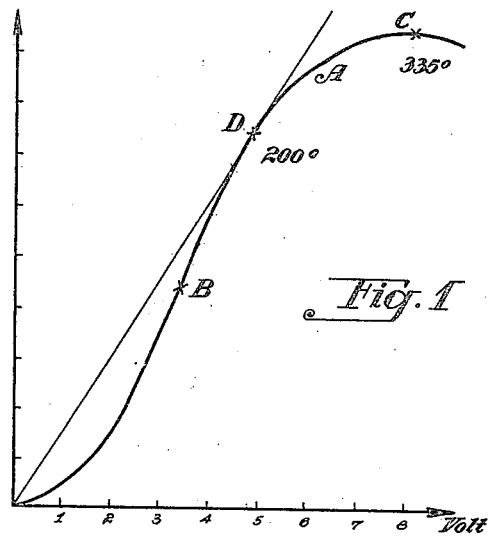
Fig. 1 shows a curve diagram.

Figure 1 shows a curve A which illustrates the deflection of a bridge galvanometer in the above described arrangement when the amount of carbonic acid is constant but the heating voltages vary. The heating voltages are shown as abscissæ and the ordinates indicate the strength of the current in the diagonal branch of the bridge. In the method customary hitherto for the determination of the amount of carbonic acid in flue gases the testing wires are generally heated to a temperature of slightly above 100° C., which corresponds to about the point B of the curve. It will be obvious that in this case the indications of the measuring instrument are affected to an extraordinary extent by any fluctuations in the working voltage and consequently also in the strength of the heating current. In order to overcome these disadvantages, use is made according to my invention of the range of heating temperatures the upper and the lower limits of which lie in the neighborhood of the points C and D respectively. As will be seen the curve A has a pronounced maximum at C which corresponds to a heating temperature of about 335° C. If the strength of the heating current be so regulated that the wires become heated to a temperature of about 335° C., I can obtain, with an ordinary galvanometer, indications of the amount of carbonic acid contained in the flue gases which are exceedingly accurate and practically independent of any fluctuations in the strength of the heating current.

If a tangent be drawn from the zero point of the co-ordinate system to the curve A this tangent will touch the curve at the point D which corresponds to a heating temperature of about 200° C. Temperatures in the neighborhood of this point also can be used with particular advantage in the determination of carbonic acid. For this purpose proportional instruments may be used with advantage such for example as crossed coil or double coil instruments heated by either direct or alternating current. The indications given by the instruments are then dependent upon the impressed working voltage and furthermore it is superfluous, when using alternating currents, to employ reducing rheostats as is necessary usually when heating with a direct current. The fluctuations in the working voltage cause in this case fluctuations in the magnitude of the measurements which are linearly proportional to such voltage fluctuations.

Figure 2:
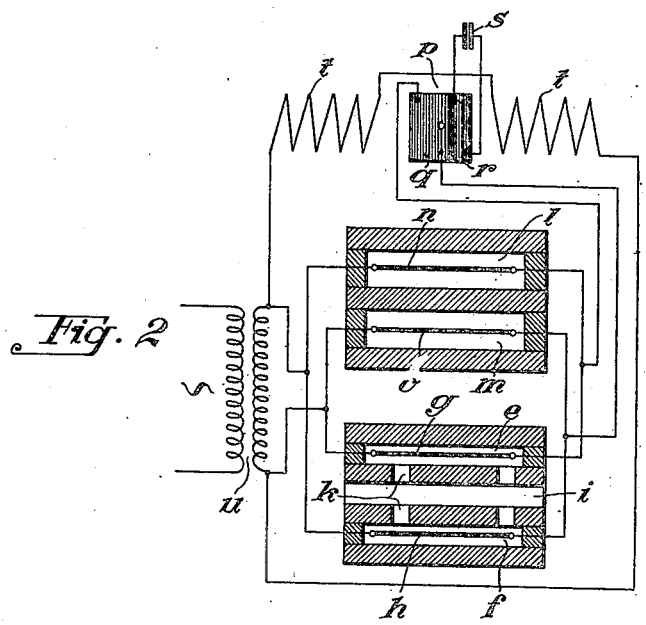
Fig. 2 illustrates, partly in section, a preferred form of apparatus for carrying out my improved method.

In Fig. 2 is shown by way of example an appliance for carrying out the method last described, using an alternating current. In the measuring chambers $e$ and $f$ are placed the testing wires $g$ and $h$ respectively. Between the measuring chambers is provided a passage $i$ for the flue gases, which passage communicates through openings $k$ with the chambers $e$ and $f$. The comparative gas, air for example, is contained in the chambers $l$ and $m$, in which the comparison wires $n$ and $o$ are located. The wires $g$, $h$ and $n$, $o$ are arranged in a bridge connection, in the diagonal branch of which a comparison instrument $p$ is located. This instrument is for example shown as a double coil instrument. It contains a coil $q$ which is inserted in the diagonal branch and a second coil $r$ which is short-circuited across a condenser $s$. The field coil of the instrument $p$ is indicated at $t$. The bridge is supplied with current and the field coil $t$ excited by a transformer $u$, the ratio of which is so proportioned that the testing wires $g$, $h$ and the comparison wires $n$, $o$ are heated to a temperature of about 250° C. It is obvious that the comparison instrument may be constructed either as an indicating or a registering instrument. If the double coil of the instrument be a crossed coil, the ratios of the resistances of the branches of the bridge increase proportionally to the working voltage, the independence of the adjustment of the instrument from the voltage being achieved in the aforesaid range of heating temperature from about 200° C. to about 350° C.

What I claim as my invention and desire to be secured by Letters Patent is:—

The method of using an apparatus for the determination of the percentage of carbonic acid in flue gases comprising in combination at least one testing wire surrounded by the flue gases, another wire lying in a comparison gas, connections between said first and second named wire for establishing a Wheatstone bridge, and a double coil instrument inserted in the diagonal branch of the said bridge, said method consisting of supplying the said bridge with electric current of such intensity that the said first and the said second wire have the same temperatures which lie from 200° C. to 350° C.

In testimony whereof I affix my signature.

HEINZ GRÜSS.